Feb. 26, 1929.  A. H. TESSIN  1,703,182
METHOD OF REMOVING GAS POCKETS FROM DOUGH
Filed Feb. 6, 1928
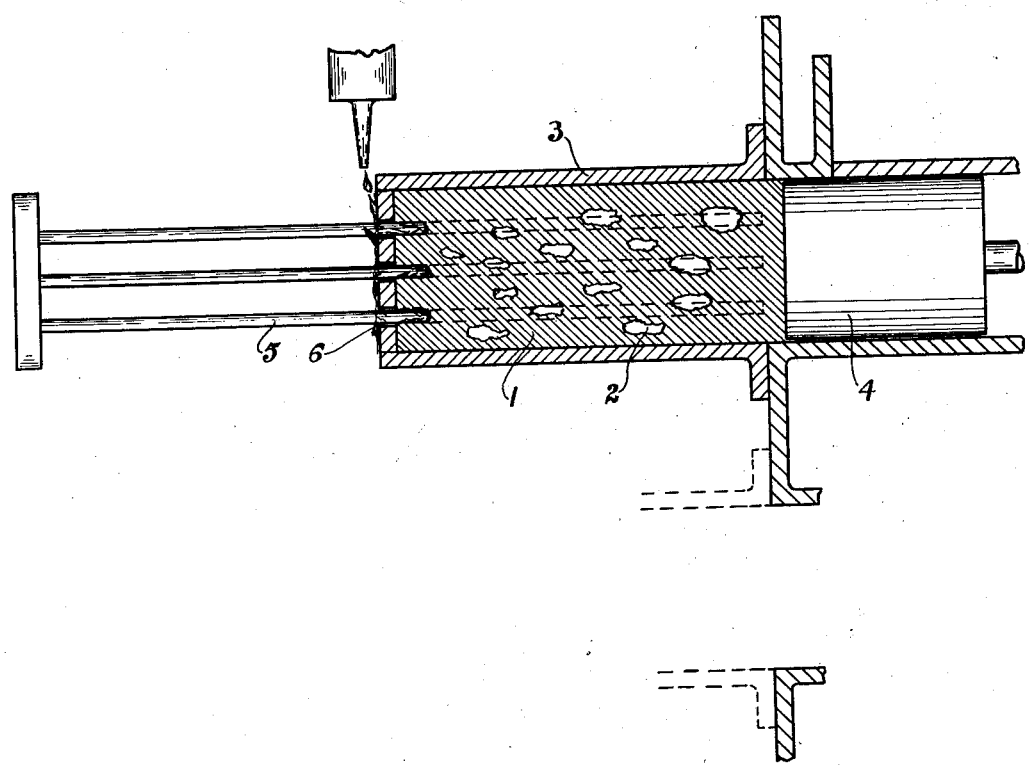
ARTHUR H. TESSIN INVENTOR
BY George B. Willcox
ATTORNEY Patented Feb. 26, 1929.

1,703,182

UNITED STATES PATENT OFFICE.

ARTHUR H. TESSIN, OF SAGINAW, MICHIGAN, ASSIGNOR TO BAKER PERKINS COMPANY, INC., OF SAGINAW, MICHIGAN, A CORPORATION OF NEW YORK.

METHOD OF REMOVING GAS POCKETS FROM DOUGH.

Application filed February 6, 1928. Serial No. 252,131.

This invention relates to the baking art and pertains more particularly to a method of dividing a dough mass into pieces of uniform weight, as well as uniform volume. The method, while capable of being carried out by automatic machinery, may also be performed by hand. Therefore, while I illustrate diagrammatically a mechanical means, it will be understood that the claimed invention is in the method or mode of operation, not in the machine.

In my co-pending application, Serial No. 252,130 filed Feb. 6, 1928, I have shown and claimed a preferred mechanism for carrying out this method.

In a properly mixed dough mass the gluten has been developed to a state in which it is extremely tenacious and can be sheeted out by stretching, somewhat like thin rubber.

In this condition gas that is generated in the mass by fermentation not only forms small bubbles, but frequently makes large cavities of irregular shape throughout the mass, especially if the dough is much handled between the mixing and the dough-dividing operations. If these pockets are large and irregularly distributed, loaves of unequal weight will be produced, provided the dough mass is divided into pieces of equal volume, the loaves with the largest gas pockets being lightest in weight.

The food inspection regulations of most countries require extreme accuracy in the weight of the finished loaves, their size and texture being a matter of no importance to the food inspector.

It is, therefore, important in commercial baking that all large gas pockets be eliminated from the dough mass prior to its being divided into pieces of uniform volume.

On account of the tenacity of the gluten it is extremely difficult to get the gas out of a dough piece by pounding, rolling or like handling under atmospheric pressure. Moreover, such methods are undesirable, because the less the dough is punished after mixing is completed, the better. It is, therefore, an object of my present method to provide a handling that will quickly and positively deprive the dough mass of its larger gas pockets and render it practically homogeneous throughout.

The method as claimed is for producing pieces of uniform weight from dough material that is characterized by having variant gas pockets scattered through it. The method consists in subjecting a dough portion to pressure greater than atmospheric, thrusting it through with a piercing implement that penetrates the walls of the pockets of compressed gas, simultaneously coating with lubricant, such as edible oil, the dough surfaces that have been formed by piercing, so that adhesion along said surfaces is weakened and there is formed a gas-venting channel of least resistance from the gas pockets to a point outside said receptacle, and adding to the dough portion a volume of dough equivalent to the volume of gas so liberated.

The dough mass, which has just been freed of its larger gas pocket and built up to its predetermined volume, is then cut off from the main body of dough in pieces of uniform volume and uniform weight.

In carrying out my improved process I take a portion of previously mixed dough, represented diagrammatically in the sectional view of the drawing and designated by numeral 1. This portion, like the main batch, contains gas pockets 2 that normally increase in size so long as fermentaiton continues. This dough portion is placed in a closed container such as the dough pocket 3 of a dividing machine. In this closed vessel the dough is subjected to heavy pressure, which may be applied externally by means of a plunger 4. While the mass is under pressure it is pierced throughout by any suitable piercing implements, such as rods 5 that enter the closed pocket 3 through openings 6 in one of its walls and pierce through the dough in the manner indicated by dotted lines.

The rods 5 are lubricated by edible oil or any equivalent substance that is capable of destroying or of greatly reducing the normal adhesion between the sticky dough and the surface of the piercing implement 5.

Any gas pocket, as 2, while subjected to heavy pressure by plunger 4 is punctured by the previously oiled implement 5. The gas immediately escapes to the atmosphere through the holes 6, following the path of least resistance, which is along the rod 5, where the adhesion of the dough to the rod has been destroyed, or at least weakened by the oil. Upon collapse of the large gas pockets when pierced, the space formerly occupied by them fills with dough, and the resulting shrinkage is simultaneously made up by more dough injected by plunger 4, or other means, for applying external pressure to the dough portion.

The dough piece of predetermined volume is then cut off from the gas-freed material.

Such loaf-pieces are not only of uniform volume, but are, within the limits of good commercial practice, of uniform weight.

Having thus described my invention, what I claim and desire to secure by Letters Patent is:

1. The method of producing pieces of uniform weight from dough material characterized by variant gas pockets scattered therethrough which consists in enclosing a portion of the material in a receptacle, subjecting the portion within the receptacle to pressure greater than atmospheric, thrusting a piercing implement into the receptacle and piercing the walls of said gas pockets, simultaneously coating with lubricant the dough surfaces that are severed by piercing, whereby adhesion at said severed surfaces is weakened and there is formed a gas venting channel of least resistance extending from said pockets to a point outside said receptacle, and injecting into the receptacle a volume of dough equivalent to the volume of gas so liberated.

2. The method of producing pieces of uniform weight from dough material characterized by variant gas pockets scattered therethrough which consists in enclosing a portion of the material in a receptacle, subjecting the portion within the receptacle to pressure greater than atmospheric, thrusting a plurality of piercing implements into the receptacle and piercing the walls of said gas pockets, thereby forming gas venting channels of least resistance from said pockets to points outside said receptacle, and injecting into the receptacle a volume of dough equivalent to the volume of gas so liberated.

In testimony whereof, I affix my signature.

ARTHUR H. TESSIN.